United States Patent
Hall

(10) Patent No.: US 10,488,637 B2
(45) Date of Patent: Nov. 26, 2019

(54) MULTIPLE FIELD OF VIEW REFLECTIVE AFOCAL ASSEMBLY WITH COMMON AXIS FOR FOV SWITCHING AND IMAGE ROLL

(71) Applicant: United States of America, as represented by the Secretary of the Army, Fort Belvoir, VA (US)

(72) Inventor: John M. Hall, Stafford, VA (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 219 days.

(21) Appl. No.: 15/786,630

(22) Filed: Oct. 18, 2017

(65) Prior Publication Data

US 2019/0113724 A1 Apr. 18, 2019

(51) Int. Cl.
*G02B 17/06* (2006.01)
*G02B 7/182* (2006.01)
*G02B 5/10* (2006.01)

(52) U.S. Cl.
CPC ........... *G02B 17/0694* (2013.01); *G02B 5/10* (2013.01); *G02B 7/1821* (2013.01); *G02B 17/0636* (2013.01)

(58) Field of Classification Search
CPC .. G02B 17/0694; G02B 5/10; G02B 17/0636; G02B 7/1821
See application file for complete search history.

(56) References Cited

U.S. PATENT DOCUMENTS

| | | | |
|---|---|---|---|
| 5,142,417 A * | 8/1992 | Brunn | G02B 17/0642 359/859 |
| 5,229,880 A | 7/1993 | Spencer et al. | |
| 5,477,395 A * | 12/1995 | Cook | G02B 17/0657 359/365 |
| 6,274,868 B1 | 8/2001 | Hall et al. | |
| 6,970,286 B1 * | 11/2005 | Kunick | G02B 17/0663 359/364 |

* cited by examiner

*Primary Examiner* — Jade R Chwasz
(74) *Attorney, Agent, or Firm* — Richard J. Kim

(57) ABSTRACT

A reflective afocal switching assembly permits variable fields of view while at the same time providing a common axis and mechanism to achieve an optical de-roll of the image. This complex arrangement provides a relatively large change in magnification for an all-reflective optical system than can image over 0.4-12.0 micron spectrum.

9 Claims, 4 Drawing Sheets

MULTIPLE FIELD OF VIEW REFLECTIVE AFOCAL ASSEMBLY WITH COMMON AXIS FOR FOV SWITCHING AND IMAGE ROLL

GOVERNMENT INTEREST

The invention described herein may be manufactured, used, sold, imported, and/or licensed by or for the Government of the United States of America.

FIELD OF THE INVENTION

This invention is applicable to the field of optics, particularly in regards to a multiple field of view reflective afocal assembly with common axis.

BACKGROUND OF THE INVENTION

Off-axis reflective optical systems, both focal and afocal, have found use especially in applications where a broad spectral coverage and high throughput is required. Several examples of off-axis reflective optics are found in the prior art, including U.S. Pat. No. 6,274,868. The off-axis nature of the mirror elements eliminates the central obscurations found in conventional on-axis design forms such as the standard Cassegrain telescope. The advantages of the off-axis optical system forms are offset by the fact that the mirror alignments must be extremely precise, as there are no rotational degrees of freedom to take advantage of during manufacture. The required positional precision unfortunately also precludes the prior art techniques of providing manual or automatic mechanical adjustments of the positions of the mirrors in order to achieve effects such as focusing, zooming, etc. In the case of an off-axis reflective afocal optical system, it is generally not economically feasible to provide a mechanical adjustment of the existing mirror system which alters the magnification power without reducing the optical image quality. One prior art solution is described in U.S. Pat. No. 5,477,395 wherein two pre-aligned afocal assemblies are nested along a common rotational axis, such that one or other assembly can be rotated into place over the pupil in order to select a magnification. A disadvantage of U.S. Pat. No. 5,477,395 however, is that the described axis of mechanical rotation for the FOV switch, either horizontally or vertically, does not coincide with the optical axis through the pupil of the system. Because of that limitation, the mechanical switching system cannot serve a dual purpose to adjust image roll.

Image roll is a phenomenon common in aircraft sensor systems, where the aircraft pitch, yaw, and roll relative to the earth can cause the sensor projection on the ground to rotate. In many cases, the pilots prefer to have a "de-roll" capability to offset the variable effects of aircraft attitude. For navigation use, de-roll can be used to ensure the earth's horizon as seen by the sensor remains in same position as seen out the window. In digital mapping applications, de-roll can be used to ensure each ground sample image is aligned symmetrically with the next sequential sample image so that they can be stitched together to form a composite map. In the prior art for nested multiple field of view afocals, a de-roll capability would require a second rotational mechanism.

SUMMARY OF THE INVENTION

A reflective afocal switching assembly permits variable fields of view while at the same time providing a common axis and mechanism to achieve an optical de-roll of the image. This complex arrangement provides a relatively large change in magnification for an all-reflective optical system than can image over 0.4-12.0 micron spectrum.

A method and apparatus involving co-location of a high magnification off-axis reflective afocal with a lower magnification power afocal is disclosed, wherein the low power afocal as a subassembly rotates 90° about an common roll axis within the high power afocal to either intercept or bypass the optical beam and thereby change the system magnification, while at the same time both assemblies may rotate together about the same exit pupil optical axis by use of a common mechanism in order to produce image roll. To achieve a third magnification option, a flat mirror may also be inserted along the optical axis to bypass both the high and low power afocals, resulting in a simple unity 1× power optical relay which also maintains rotation about a common roll axis.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
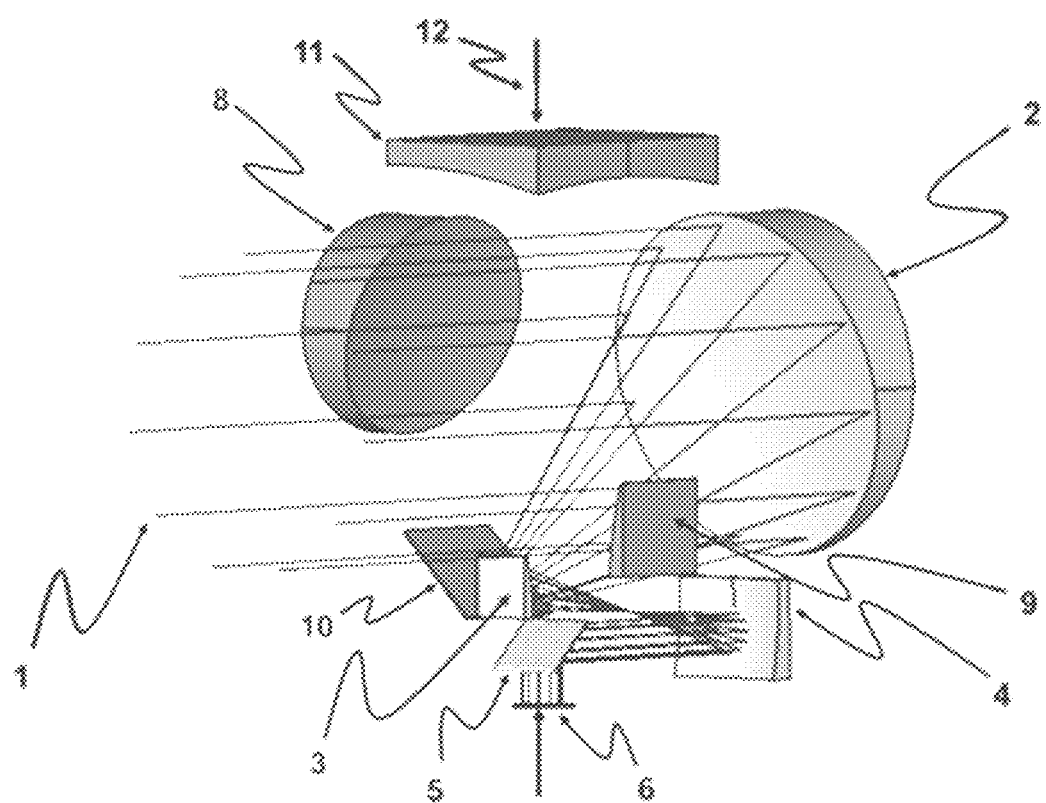
FIG. 1 illustrates a high magnification mode of operation in which light rays are shown entering an exemplary multiple field of view off-axis reflective afocal assembly with common axis from an outside scene.

FIG. 1 illustrates a high magnification mode of operation in which light rays are shown entering an exemplary multiple field of view off-axis reflective afocal assembly with common axis from an outside scene. Specifically, FIG. 1 shows the high magnification mode in which optical light rays 1 enter the optical system from an outside scene. In the high power afocal mode of operation, the light rays 1 strike the afocal primary mirror 2, then propagate to secondary and tertiary mirrors 3 and 4, and then progress to a final fold mirror 5 which directs light through the exit pupil 6 which defines the common roll axis. The primary mirror 2 is concave to provide positive optical power and may have a parabolic, conic, or higher order aspheric curvature. The secondary mirror 3 is has a negative convex shape to supply negative optical power, and it may be hyperboloid, conic, or a higher order asphere. The tertiary mirror 4 has a basic concave surface to provide positive optical power, and it may have parabolic, conic, or higher order aspheric surface curvatures. The fold mirror 5 is optically flat and serves to re-direct the optical beam towards the system exit pupil 6. Mirror elements 8, 9, 10, and 11 comprise the low power afocal and are bypassed in this mode, as they are rotated 90° about the common roll axis 12. The low power assembly has elements similar to that of the high power, but in a slightly different order. Element 8 is a concave primary mirror, mirror 9 is a negative powered secondary. Mirror 10 simply folds the system, and has a flat surface with virtually no optical power. Mirror 11 serves as the tertiary in terms of providing the final positive power. Note that the function of mirror 10 in the low power configuration is analogous to mirror 5 in the high power configuration, except that in the low power configuration the mirror 10 is located between the secondary 9 and tertiary 11, whereas in the high power assembly the flat mirror 5 is the last element prior to the exit pupil. This shift in the relative location of the flat fold mirrors facilitates the common de-roll axis. Generally, the above mirrors can all be machined using single point diamond turning techniques which provide the necessary surface figures and specular smooth finishes. The mirrors are typically made of readily available metals, such as Aluminum 6061, in order to provide thermal equilibrium when the housings are made of similar materials. In the embodiment shown, the high power afocal system provides an 8× magnification with an 8" entrance pupil, a minimum 1° field of view, and a 1" exit pupil. The low power afocal system provides roughly 3.2× magnification, a 3.2" entrance pupil, a minimum 3° field of view, and a matching 1" exit pupil.

Figure 2:
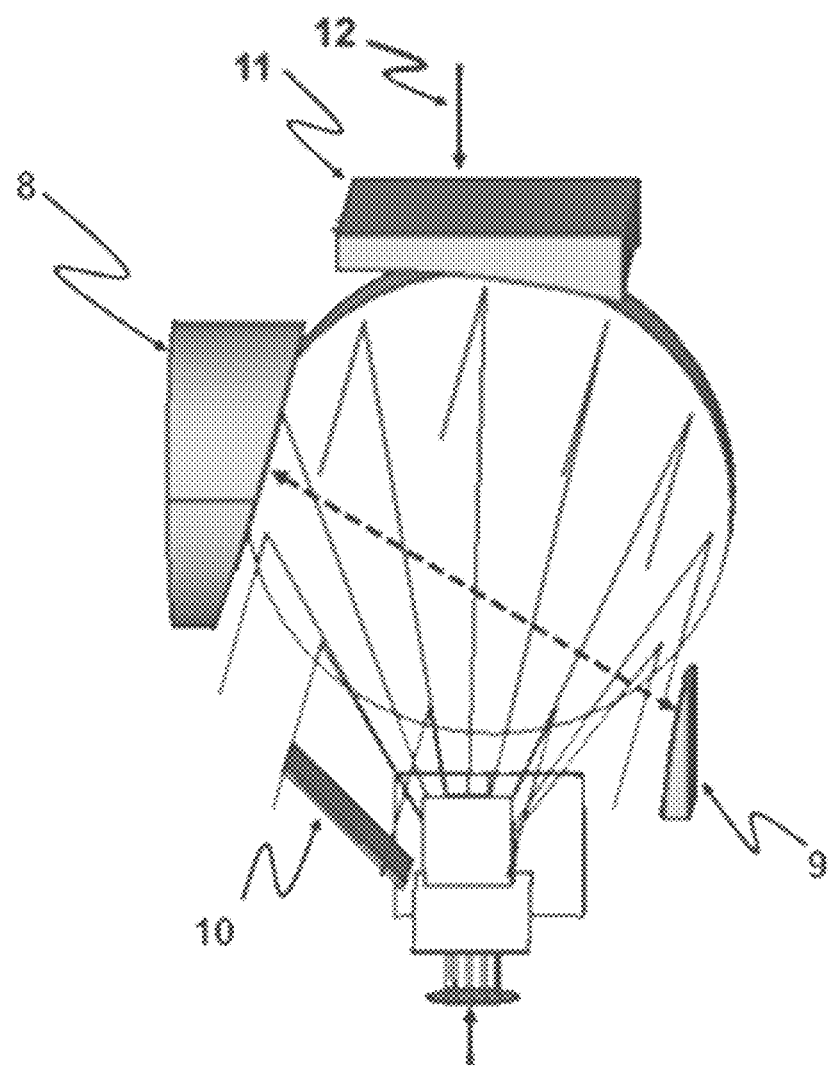
FIG. 2 shows the positions of mirror elements and associated mounting features rotated 90° about an exit pupil such that the light rays which operate in the high magnification mode are not obscured.

FIG. 2 shows the positions of mirror elements and associated mounting features rotated 90° about an exit pupil such that the light rays which operate in the high magnification mode are not obscured. Specifically, FIG. 2 shows the positions of the mirror elements 8, 9, 10, and 11 and any associated mounting features is such that when rotated 90° about the exit pupil axis 12, they do not obscure the light rays 1 which operate in the high magnification mode.

Figure 3:
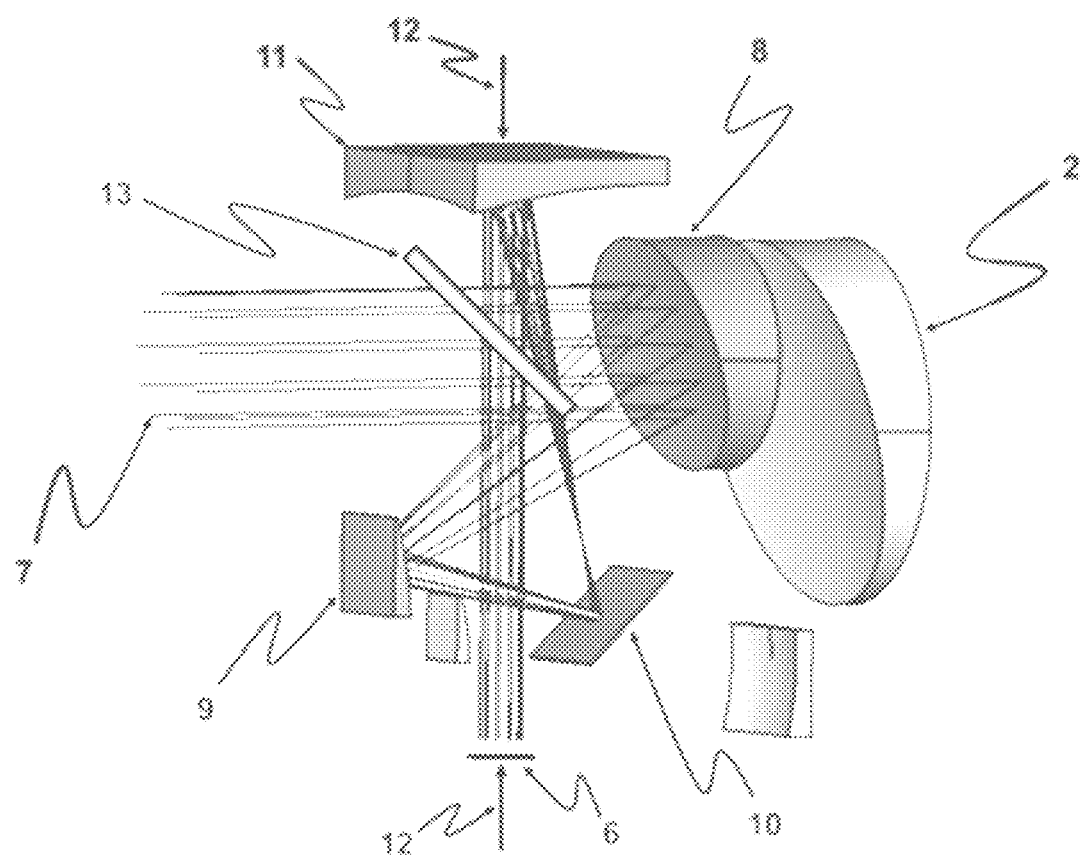
FIG. 3 illustrates a low magnification mode of operation in which a low power afocal optical assembly is now rotated 90° about the axis of the exit pupil in order to intercept a different set of light rays from the scene.

FIG. 3 illustrates a low magnification mode of operation in which a low power afocal optical assembly is now rotated 90° about the axis of the exit pupil in order to intercept a different set of light rays from the scene. Specifically, FIG. 3 represents the low magnification mode, wherein the low power afocal optical assembly comprised of mirrors 8, 9, 10, and 11 is now rotated 90° about the axis 12 of the exit pupil 6 relative to FIG. 1 in order to intercept a different set of light rays from the scene 7, bounce off the mirrors 8, 9, 10, and 11. A third field of view option for a total 1× magnification can be obtained by flipping on a flat mirror 13 between the low power afocal tertiary mirror 11 and the exit pupil 6.

Figure 4:
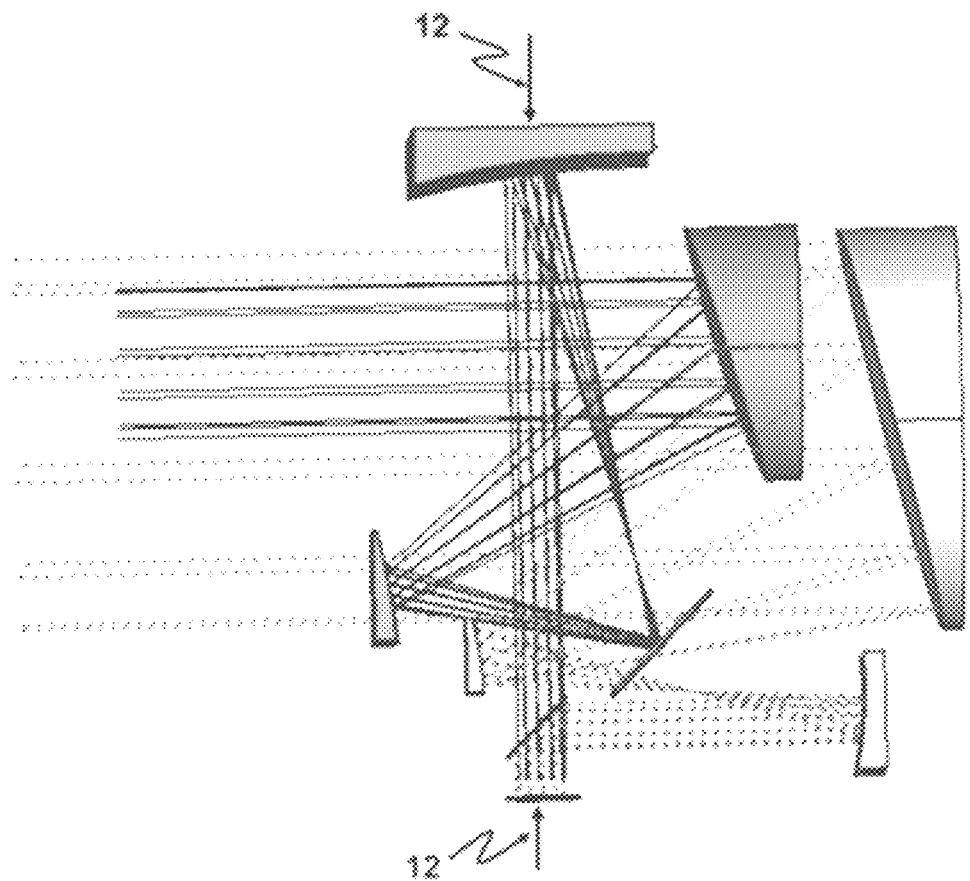
FIG. 4 shows a superimposed trace of both afocal assemblies relative to the common roll axis.

FIG. 4 shows a superimposed trace of both afocal assemblies relative to the common roll axis 12. Either afocal assembly may rotate about 12 in order to achieve an image de-roll effect. In this way, the same mechanism used to switch between afocals can also be used for de-roll.

It is obvious that many modifications and variations of the present invention are possible in light of the above teachings. It is therefore to be understood that within the scope of the appended claims, the invention may be practiced otherwise than as described.

What is claimed is:

1. A multiple field of view optical system based on off-axis reflective afocal assemblies having a common axis for FOV switching and image roll, comprising:
   a high magnification mode off-axis reflective afocal assembly rotatable about a common axis for FOV switching and image roll to be able to receive optical light rays entering the optical system from an outside scene, the high magnification mode off-axis reflective afocal assembly comprising:
      an afocal primary mirror having a concave reflective surface to reflect said optical light rays entering the optical system from an outside scene,
      a secondary mirror having a negative convex shape reflective surface,
      a tertiary mirror having a basic concave reflective surface, and
      a final fold mirror having an optically flat reflective surface and serves to re-direct an optical beam along the common axis towards a system exit pupil; and
   a low magnification mode reflective afocal subassembly separately rotatable about the common axis for FOV switching and image roll, comprising:
      a concave primary mirror,
      a negative powered secondary mirror,
      a flat surface mirror, and
      a low power afocal tertiary mirror providing the final positive power directed along the common axis to the exit pupil,
   wherein, the high magnification mode off-axis reflective afocal assembly and the low magnification mode reflective afocal subassembly can rotate about the common axis for FOV switching and image roll to switch the multiple field of view optical system between high or low magnification modes, and to achieve image de-roll.

2. The multiple field of view optical system based on off-axis reflective afocal assemblies having a common axis according to claim 1, comprising a third field of view flat mirror disposed between the low power afocal tertiary mirror and the exit pupil, wherein, a third field of view option for a total 1× magnification can be obtained by flipping to dispose said third field of view flat mirror between the low power afocal tertiary mirror and the exit pupil.

3. The multiple field of view optical system based on off-axis reflective afocal assemblies having a common axis according to claim 1, wherein
   the afocal primary mirror is concave to provide positive optical power, characterized by a parabolic, conic, or higher order aspheric curvature;
   the secondary mirror has a negative convex shape to supply negative optical power, characterized as being hyperboloid, conic, or a higher order asphere; and
   the tertiary mirror has a basic concave surface to provide positive optical power, further characterized by parabolic, conic, or higher order aspheric surface curvatures.

4. The multiple field of view optical system based on off-axis reflective afocal assemblies having a common axis according to claim 1, wherein, to switch the multiple field of view optical system to the low magnification mode, the low magnification mode reflective afocal subassembly is rotated 90° about the common axis of the exit pupil for intercepting a different set of light rays from the outside scene by the concave primary mirror of the low magnification mode reflective afocal subassembly.

5. The multiple field of view optical system based on off-axis reflective afocal assemblies having a common axis according to claim 1, wherein the flat surface mirror in the low magnification mode reflective afocal subassembly in the low power configuration is located between the negative powered secondary mirror and the low power afocal tertiary mirror, whereas in the high magnification mode off-axis reflective afocal assembly, the final fold mirror having an optically flat reflective surface is the last optical element prior to the exit pupil.

6. The multiple field of view optical system based on off-axis reflective afocal assemblies having a common axis according to claim 1, wherein said mirrors are machined using single point diamond turning to provide the respective surface figures and specular smooth finishes.

7. The multiple field of view optical system based on off-axis reflective afocal assemblies having a common axis according to claim 1, wherein said mirrors are based on Aluminum 6061 alloy capable of providing thermal equilibrium with housings.

8. The multiple field of view optical system based on off-axis reflective afocal assemblies having a common axis according to claim 1, wherein, to switch the multiple field of view optical system to the high magnification mode, the low magnification mode reflective afocal subassembly is rotated 90° about the common axis such that the low magnification mode reflective afocal subassembly as rotated does not obscure optical paths of the high magnification mode off-axis reflective afocal assembly.

9. A multiple field of view optical system based on off-axis reflective afocal assemblies having a common axis for FOV switching and image roll, comprising:
- a high magnification mode off-axis reflective afocal assembly rotatable about a common axis to be able to receive optical light rays entering the optical system from an outside scene, the high magnification mode off-axis reflective afocal assembly comprising:
  - an afocal primary mirror having a concave reflective surface to reflect said optical light rays entering the optical system from an outside scene,
  - a secondary mirror having a negative convex shape reflective surface,
  - a tertiary mirror having a basic concave reflective surface, and
  - a final fold mirror having an optically flat reflective surface and serves to re-direct an optical beam along the common axis towards a system exit pupil; and
- a low magnification mode reflective afocal subassembly separately rotatable about the common axis, comprising:
  - a concave primary mirror,
  - a negative powered secondary mirror,
  - a flat surface mirror, and
  - a low power afocal tertiary mirror providing the final positive power directed along the common axis to the exit pupil,
wherein, the high magnification mode off-axis reflective afocal assembly and the low magnification mode reflective afocal subassembly can rotate about the common axis to switch the multiple field of view optical system between high or low magnification modes, or to achieve image de-roll, wherein the high magnification mode off-axis reflective afocal assembly provides an 8× magnification with an 8" entrance pupil, a minimum 1° field of view, and a 1" exit pupil, whereas the low magnification mode reflective afocal subassembly provides roughly 3.2× magnification, a 3.2" entrance pupil, a minimum 3° field of view, and a matching 1" exit pupil.

* * * * *